Figure 1:
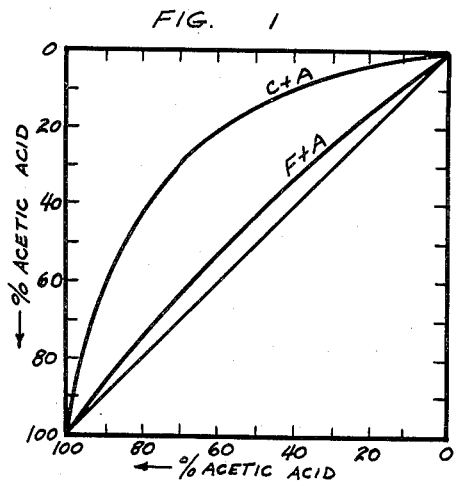

March 6, 1962

D. F. OTHMER ET AL 3,024,170

PROCESS OF AZEOTROPIC DISTILLATION OF
FORMIC ACID FROM ACETIC ACID

Filed June 15, 1959

2 Sheets-Sheet 1

DONALD F. OTHMER
JAMES J. CONTI, JR.
INVENTORS

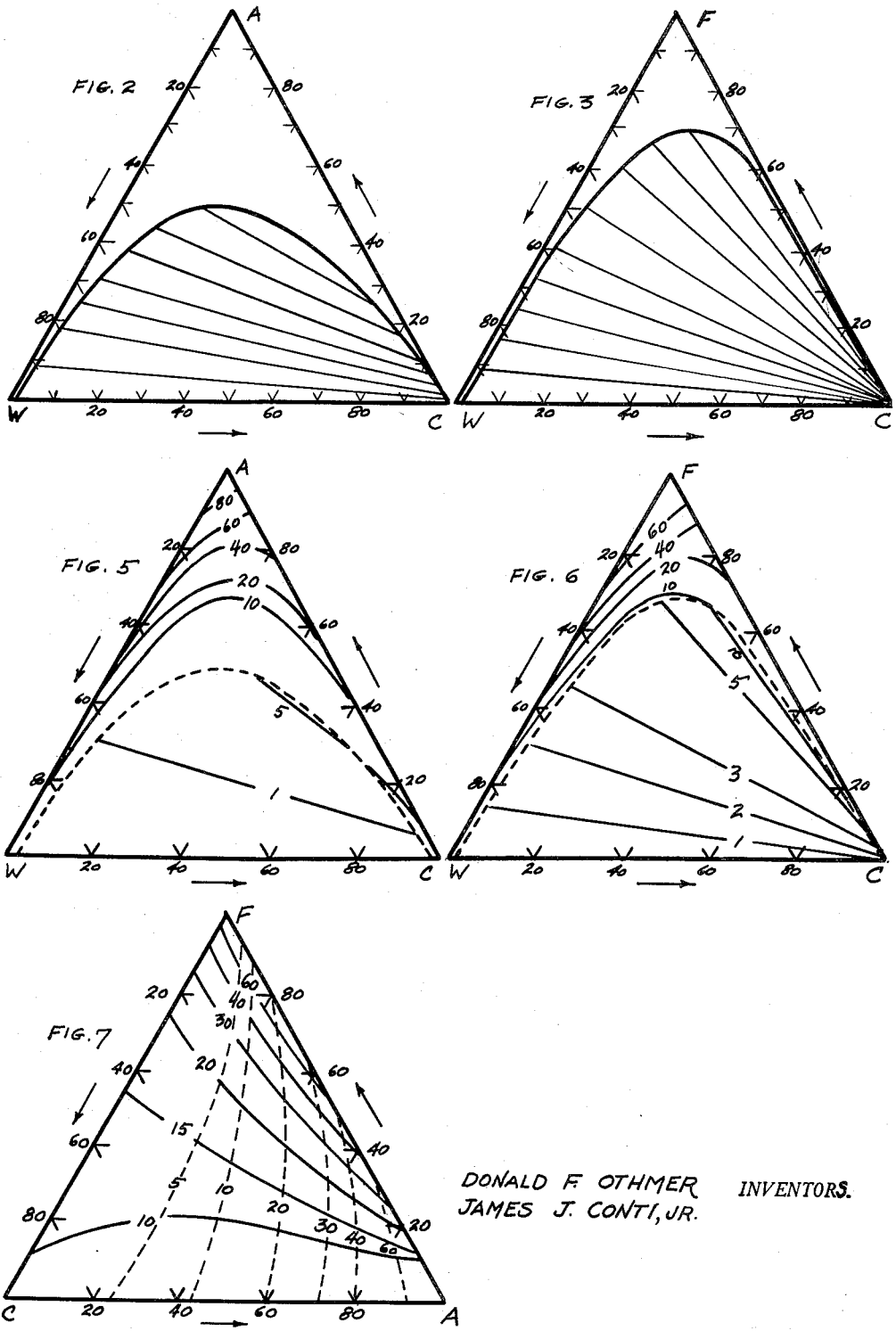

3,024,170
Patented Mar. 6, 1962

3,024,170
PROCESS OF AZEOTROPIC DISTILLATION OF FORMIC ACID FROM ACETIC ACID
Donald F. Othmer, Coudersport, Pa., and James J. Conti, Jr., Pittsburgh, Pa. (2302 E. 2nd St., Brooklyn 23, N.Y.)
Filed June 15, 1959, Ser. No. 820,245
10 Claims. (Cl. 202—42)

The present invention relates to a process of separating formic acid from mixtures with acetic acid alone, or from mixtures containing a small amount of water, by azeotropically distilling the formic acid away from the acetic acid using an added liquid as an entrainer for the formic acid. The formic acid then contains some entrainer which is distilled therefrom in a second distillation. The original acid mixture or aqueous acid mixture may contain minor amounts of propionic acid, or higher homologous acids, particularly butyric acid as well as other dissolved impurities, either liquids or solids.

In the usual case, mixtures of these lower aliphatic acids encountered in industrial practice contain relatively large amounts of water. All or substantially all of this water may be completely removed from the mixture of acids before the separation of the formic acid is attempted. Thus, in some cases no water will be present, while usually a very small amount—a few percent of the amount of the total acids—will be present. Usually, the dehydration by other processing should be conducted first so that only a few percent of water remains since dehydration may be done much more economically by other methods than that used for separation of the formic acid. If for some reason a larger amount of water than a few percent of the acid mixture is present and is not removed prior to the formic acid separation, it may be removed from the acetic acid simultaneously with the formic acid and by the same entrainer. It may then be separated from the formic acid by another means—possibly by a distillation with the use of another entrainer. The first entrainer used for formic acid removal is most undesirable for separating water from formic acid since the very properties which make it suitable for separating formic acid by an overhead distillation from acetic acid will make it most unsuitable for the separation of water from formic acid.

In the present invention, it has been found that the entrainer should:

(a) Form an azeotropic mixture with formic acid boiling as far below the boiling point of formic acid as possible, to allow ready separation therefrom, and carrying as much formic acid as possible, to minimize heat costs;

(b) Form no azeotropic mixture with acetic acid;

(c) Be soluble in all proportions in both acetic acid and formic acid at all temperatures between room temperature and the boiling point of any mixture with either acetic acid or formic acid;

(d) Have relatively little solubility with formic acid containing a small amount of water;

(e) Be as insoluble as possible in water (hence it will form a heterogeneous azeotropic mixture with water);

(f) Have as high a distribution coefficient as possible for acetic acid or formic acid when in contact with aqueous mixtures of either or both of the acids;

(g) Allow quantitative or nearly quantitative separation of both formic acid from acetic acid and acetic acid from formic acid with as small requirement of heat as possible.

Thus in (a) the boiling point of the entrainer selected (and hence of the corresponding azeotropic mixture with formic acid) must be selected as a compromise so that it is neither too low nor too high. If it is too low there will be a low ratio of formic acid in the mixture, i.e. a higher amount of entrainer to be distilled for a given amount of formic acid handled and hence a higher heat cost. Furthermore, it will be difficult to condense completely the azeotropic mixtures with cooling water of usual temperature; and processing losses of the entrainer will be high. If the boiling point of the entrainer is too high, i.e. above about 85° C., there will be an azeotropic mixture with acetic acid—if indeed there is one with formic acid—and the separation from the formic acid becomes increasingly difficult.

The above requirements are to some extent mutually antagonistic.

However, on balance of the properties, one single material, chloroform, has been found uniquely good when operated in a process combining the two distillations above specified: the first distills formic acid and entrainer (together with the small amount of water usually present) out of acetic acid; the second distills entrainer out of formic acid.

The overhead vapors of both distillations are passed to a single condenser which discharges a two-phase or two-layer condensate to a decanter. The layer containing most of the entrainer is passed back as reflux to the first distillation—from which acetic acid is discharged as the bottoms product; and the layer containing most of the formic acid (and most of the water) is passed forward to the second distillation from which formic acid is discharged as the bottoms product.

In the case where an anhydrous mixture of formic acid and acetic acid is being separated, the operation of the first column is the same, although no water comes in the feed to form an azeotropic mixture with the chloroform. The chloroform-formic acid azeotropic mixture is distilled overhead and condensed. A small amount of water is necessary to cause a phase separation. This is added to the condensed liquid going to the decanter. The water layer formed contains most of the formic acid and is passed to the second column, where the operation is as before. A small amount of water distills with the vapors from the second column. Also a small amount is dissolved in the chloroform layer going back to the first column and comes back with the vapors therefrom. Thus a cycle of water is established including the tops of the columns, the condenser and the decanter. Only a very small amount of water thus need be added, and this all discharges in admixture with the formic acid from the base of the second column. Usually the formic acid may be used or sold containing the small amount of water present; if not, this mixture may be dehydrated by known methods.

BACKGROUND OF PRESENT PRACTICE

Simple Rectification

It is known that it is theoretically possible to separate formic acid from acetic acid by simple rectification because of the difference in their boiling points of 100° C. and 118° C. respectively, and the absence of a constant boiling mixture of the two. However, in practice, this separation is exceedingly expensive of heat and requires a very efficient distilling column because of the closeness of the composition of formic acid in the vapor phase distilled from a given composition of formic acid in the liquid phase in mixture with acetic acid. This is shown in FIGURE 1 by the curve showing the vapor composition as percent acetic acid as related to the liquid composition. This is very close to the 45° diagonal line, at which the vapor composition would equal the liquid composition, and shows that distillation achieves very little separation of the two acids.

By comparison it is relatively easy to separate by distillation chloroform from acetic acid. This is also shown in FIGURE 1 by the comparative wide spread from the 45° diagonal of the curve representing this vapor-liquid relation. (Both curves of FIGURE 1 have been plotted from data carefully and precisely determined to demonstrate this invention.)

U.S. Patent 1,813,636

It is also known that certain liquids called "entrainers" may be added to mixtures of the two acids. These, because of their property of distilling azeotropically with the formic acid, greatly decrease its effective boiling point (and greatly increase its respective volatility) with regard to that of the acetic acid, which is relatively less affected by the presence of the entrainer. The azeotropic or minimum constant-boiling mixture with the formic acid is thus distilled at a much lower temperature than is formic acid itself; and this mixture can readily be rectified away from the acetic acid.

In U.S. Patent 1,813,636 to Peterson and Englebrecht, the entrainer added is defined as one which "mixes well with acetic acid, but not at all or only to a small extent, with formic acid and forms with the latter an azeotropic mixture." The process of this patent allows the separation of all of the formic acid from the acetic acid; but every one of the exemplary liquids of this invention also forms an azeotropic distillation with the acetic acid. Thus, some acetic acid is always discharged with the formic acid while it is being distilled away from the larger part of the acetic acid. Hence, while the process allows separating of formic acid present as an impurity away from the acetic acid, it is not useful for purifying formic acid which might be desired by itself to be separated completely from the acetic acid of a mixture of the two acids. Furthermore, the requirement that it mix "not at all or only to a small extent with formic acid" has been found to be undesirable, and not a property of an optimum entrainer, such as chloroform.

U.S. Patent 2,038,865

Wentworth and Baechle recommended thiophene as an entrainer "because of its insolubility in formic acid." However, as noted above and explained below, the best entrainers for this separation in the process described are those which are soluble or "mix" with the formic acid.

British Patent 727,078

The Celanese Corporation of America, referred herein to the use of pentane and hexane since they "form azeotropic mixtures with formic acid, unlike such other liquids (entrainers) they do not form azeotropic mixtures with aliphatic carboxylic acids of higher molecular weight" (i.e. acetic acid). It has been found by careful laboratory studies that the preferred entrainers of British 727,078, do indeed form a constant boiling mixture with acetice acid; and, in fact, the Example 2 shows that acetic acid does indeed come over in the azeotropic distillation with the entrainer and with the formic acid and water to give a mixture which cannot be separated by the cited process to give a pure formic acid. Here again, the process is intended mainly for purifying acetic acid by ridding it of formic acid, even though this may lose some acetic acid therewith, in small amount compared to the total amount handled.

Also, it has been determined by careful laboratory studies that formic acid is insoluble with the preferred entrainers of this patent over wide ranges of compositions. Thus, these materials are not desirable entrainers for the newly developed process.

Individual Separation of Two Azeotropic Mixtures

Furthermore, and more recently, it has been suggested to use an azeotropic distillation to remove substantial amounts of both water and formic acid simultaneously from an aqueous mixture of acetic acid and formic acid. This process may use entrainers of the prior art, a preferred one being ethylene dichloride. It recognizes and utilizes the two azeotropic boiling mixtures and ranges in each of two distillations: (a) the azeotrope of water plus entrainer, and (b) the azeotrope of formic acid plus entrainer. These two azeotropes are distilled off the top of the first column together, to leave the acetic acid behind. After condensation, much of the entrainer is separated in a separate layer in the decanter which is returned to the first column; and the balance is sent to the second distilling column with most of the formic acid and practically all of the water. The second column separates at the top of the column the first azeotrope (water plus entrainer) boiling at about 72° C. from the second azeotrope (formic acid plus entrainer) boiling at 77° C. at some point in the middle of the column; while, in a lower part of the column this formic acid entrainer azeotrope is separated from formic acid boiling at about 100° C. at the bottom of the column along with less than 10% water.

Ethylene dichloride is the preferred material because it is the only entrainer which has been found which has even as much a difference as 5° C. between the boiling points of the entrainer-water and the entrainer-formic azeotropes. It has been known for many years (U.S. Patent 1,804,745) that ethylene chloride may be used as an entrainer to separate water from acetic acid solutions (as is here done in the first column). Since this process has been used in many plant units for thirty years with sources of acetic acid containing formic acid, e.g. from wood distillation liquors, this azeotropic distillation of the water in practice always contains the formic acid present in the original mixture which decants as described above and is discharged in the water layer from the decanter.

Thus, acetic acid has always been purified of its formic acid content in many installations as well as being dehydrated in this use of ethylene dichloride as the entrainer.

Particularly also, it has always been known in these azeotropic distillations primarily for removing water, that if the acetic acid solutions to be dehydrated contain only a small amount of water, an extremely efficient column is required, i.e. 70 or more plates with considerable reflux. If now, as more recently suggested, it is desired to separate from the acetic acid substantial amounts of formic acid along with the water, rather than merely the minor amounts of formic acid always previously encountered merely as impurities, these disadvantageous requirements of a very tall column are accentuated. Thus, the length of the first column and its heat requirements are even more excessive.

In the second column of this suggested process, the azeotropic mixture of water plus entrainer boiling at 72° C. must necessarily be separated from the azeotropic mixture of formic acid plus entrainer boiling at 77° C. This must be done in the upper part of the second column since all three, formic acid, entrainer, and water exist there; and no entrainer can be allowed to discharge from the base. This is an extremely close separation requiring excessive column length and large reflux, hence a great amount of heat. Furthermore, since the azeotropic mixture of formic acid plus entrainer must be separated entirely from the formic acid discharged from the base, an additional amount of column length is required there. Total column height required is again 70 or more plates; a very expensive fractionator, particularly when there is considered the corrosive nature of the materials worked with and the high expense of materials of construction required. Since the two separating actions are additive and accomplished in the same column, there is a major additional problem of control in industrial operation.

Moreover, in this prior art suggested process, the removal of water off the top of the second still means that it has had to be azeotropically distilled twice with ethylene dichloride—once from acetic acid in the first column and once from formic acid in the second column. The table of heat requirements in U.S. Patent 2,050,234 shows the ethylene chloride dehydration distillation to be very uneconomic compared to the use of other entrainers. Hence, only the minimum of water should be removed in the same operation as the separation of formic acid, since here it must be distilled twice with the inefficient entrainer ethylene dichloride.

Chloroform, the entrainer of the present invention, may be compared with the entrainers of this recently suggested process. In the first column, the boiling point of the ethylene dichloride-formic acid azeotrope is so high, 77° C., as compared to that for chloroform-water, 59° C., that the difference of temperature from the acetic acid at the bottom, 118° C., is only 41° as compared to 59° when using chloroform. In the second column, the difference of the water-entrainer azeotrope boiling point at the top and the formic acid boiling point at the bottom is 28° for ethylene dichloride and 44° difference for chloroform. The advantage of using chloroform is obvious. However, in the second column, the difference between the boiling points of the entrainer-water azeotrope and of the entrainer-formic azeotrope is only 3° C., too close to allow practical separation; hence, this prior art suggested process is even less possible, economically, using chloroform as compared to ethylenedichloride. Furthermore, the present invention discharges all water entering the system from base of second column, thus preventing the expensive double azeotropic dehydration.

THEORETICAL BACKGROUND

Interrelation of Solubility and Vapor Pressure Properties

The fundamental physical chemical relations controlling azeotropic distillation phenomenon involved in separating actions such as those of the present invention are exceedingly complex. The vapor pressures and boiling points of the mixtures of the several liquids are the controlling factors as in other distillation phenomena. Especially important are the relative volatilities of these materials in the mixtures encountered.

Azeotropic relationships may also be shown to be dependent on the relative mutual solubilities of the liquids, i.e. the relative liquid-liquid phase diagrams at the temperatures involved in the processing.

Furthermore, these phenomena are greatly affected by the molecular association of acetic acid and of formic acid tending to cause polymers of these acid molecules in the vapor phase, and also with the association phenomena in the presence of water.

Hence, the most desirable entrainer for the process of the present invention will be the one which has the optimum balance of these liquid-liquid and vapor-liquid equilibria to allow: (a) the maximum separating efficiency in the respective distillation columns combined with the condensing and decantation step to allow the minimum size and cost of this equipment—constructed as it must be of very expensive, corrosion resistant materials, as well as (b) the minimum amount of boil-up required, or vapors distilled and condensed, and hence, the minimum heat load and the lowest operating costs. Since separation efficiency controls the number of plates or height of the distillation columns, and the amount of boil-up controls its diameter; the size and hence cost of the distillation equipment depends on the correct selection of that entrainer which has the best combination of the interrelated liquid-liquid equilibria and vapor-liquid equilibria properties in mixtures with acetic acid, formic acid and water.

Chloroform has now been found through a determination and comparison of the data defining these physical chemical phenomenon to be this optimum and unique entrainer in practical operation of the preferred process in the manner described. However, in order to understand this superiority and to design correctly the optimum system using chloroform as the entrainer, it was necessary to determine many physical chemical data of the phase equilibria of the various mixtures. Some part of these data are shown, mainly for chloroform, as illustration of those determined, and as explanatory of the preferred process and its optimum design. Already noted above, and shown in FIGURE 1 is the spread of the vapor composition curve of the system chloroform-acetic acid, which shows the relative ease of separation by distillation of these two liquids, one essential requirement.

Figure 4:
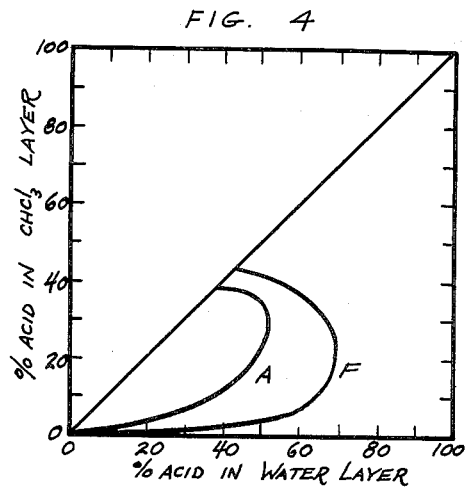

Ternary Liquid Solubilities, FIGURES 2, 3 and 4

In these figures A represents acetic acid, F represents formic acid, W represents water, and C represents chloroform.

FIGURE 2 represents the triangular phase diagram at 25° C. of the liquid system acetic acid-water-chloroform showing the area of complete miscibility above the curve and the two-phase region of partial solubility below the curve. The compositions of liquid mixtures are indicated by the intersection of the background lines denoting percentage of each of the three components, as is standard for this type of plot. The tie-lines represent the equilibrium conditions, showing the phase equilibrium of two partially miscible liquid layers, the water layer on the left connecting with the corresponding chloroform layer on the right. The resulting compositions of each phase are shown by the coordinates of these points. The relative steepness of the slopes of these lines, as well as the points of the intersections, show that acetic acid is always present in a higher strength in the water layer than in the chloroform layer. The plait point at P indicates at what composition the two layers just become completely soluble.

FIGURE 3 represents the corresponding diagram at 25° C. for formic acid-water-chloroform. This shows the relatively smaller area of complete solubility, and the greater relative solubility of formic acid in the water layer in equilibrium with chloroform layers of different acid compositions, as compared with acetic acid mixtures shown in FIGURE 1.

FIGURE 4 shows the distribution coefficient for formic acid and for acetic acid representing the percent acid strength in each case in equilibrium in the two liquid layers, water and chloroform. The much greater solubility of chloroform for acetic acid out of water solutions as compared to its solubility for formic acid out of water solutions is typical of all organic liquids—and is explained by the greater similarity as a liquid of formic acid to water, compared with acetic acid to water.

Vapor-Liquid Equilibria, FIGURES 5, 6 and 7

FIGURE 5 shows the data resulting from the careful laboratory determination of compositions of the vapors in equilibrium with definite liquid mixtures of acetic acid, water, and chloroform when compositions are again indicated by the triangular grid work. The vapor compositions for the binary systems acetic acid-water, acetic acid-chloroform (as shown in FIGURE 1), and chloroform-water had been first determined, and plotted by the method of FIGURE 1. The ternary system was then determined and plotted in FIGURE 5. The dotted line represents the solubility limits at the corresponding boiling points of the two liquid phases. This is slightly different than the corresponding line of FIGURE 2 because of the different temperature. The solid lines represent the loci of the constant percentages of acetic acid in the vapor phase in equilibrium with the liquid compositions as shown by the background gridwork. These are straight (tie lines) in the two phase region.

FIGURE 6 represents in the same way as FIGURE 5 the vapor-liquid equilibria determined for the ternary system: formic acid-water-chloroform after determining vapor-liquid equilibria for the three binary systems: formic acid-water (as shown in FIGURE 1), formic acid-chloroform, and water-chloroform. Here again the solid lines represent constant percentages of formic acid in the vapor phase, against the composition of the liquid phase on the background gridwork. The straight tie lines are apparent again.

The impossibility of adequate representation of four component vapor-liquid equilibrium conditions involved when all components are present makes it necessary to compare FIGURES 5 and 6 to understand the simplicity of the separation of formic acid out of a mixture such as would be present in the first distillation column of the present invention. Thus, if at any horizontal level represented in FIGURE 5, a given percent on the liquid of formic acid (of some given ratio to water) is noted, the vapor composition is very much higher in formic acid than it is for acetic acid under the corresponding conditions of FIGURE 6. This is very apparent where two phases are present.

FIGURE 7 shows the vapor liquid relations for the system formic acid, acetic acid, and chloroform. Here, there is no area of liquid insolubility and no heterogeneous constant boiling mixtures. The solid line curves show the vapor compositions having constant percentages of formic acid; and the dotted lines show the vapor compositions having constant percentages of acetic acid, again on a background grid of liquid compositions. The relatively higher value of the constant vapor composition lines of formic acid at a given distance from the 100% formic acid point compared with a similar value of the constant vapor composition line for acetic acid at the same distance from the 100% acetic acid point demonstrates the ease of distilling formic acid away from acetic acid in the first distillation of the process using chloroform, even if there should be no water present, as may often be the case.

Figure 8A:
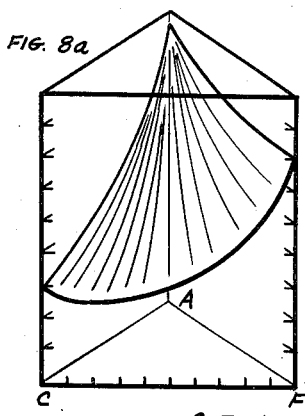
Figure 8B:
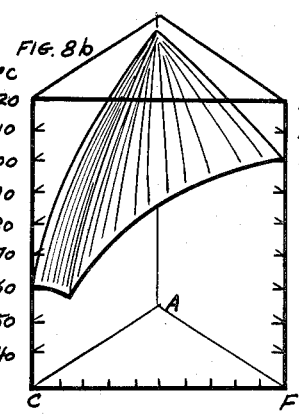
Figure 8C:
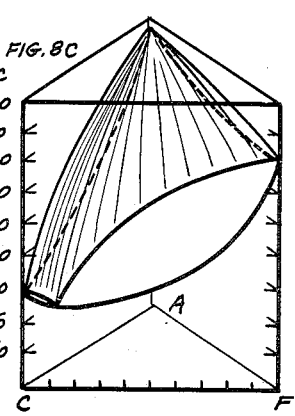

FIGURES 8a, b, c, show these same vapor-liquid phenomena of FIGURE 7 in still another diagram wherein the boiling point diagrams of the three binaries of the system acetic acid, formic acid and chloroform are plotted on the three faces of a vertical triangular prism, with temperatures plotted on the vertical axis. Here the lower surface shown in FIGURE 8a represents the loci of the bubble points for all ternary compositions. These intersect the three faces at the corresponding binary bubble point lines. This surface itself represents the temperature points at which any liquid mixture of the three components when heated will first boil. (The composition of the liquid is indicated by the triangular grid.) The upper surface shown in FIGURE 8b represents the temperature points at which any vapor mixtures of the three components when cooled will first condense, i.e. the loci of the dew points. The effective lowering of the effective boiling point of formic acid by the addition of chloroform is well shown to give the minimum constant boiling (azeotropic) mixture at the lowest temperature of any point for the three-component system. FIGURE 8c shows the combination of both boiling curves and condensing curves on the three binary faces. The dotted lines show the relationship of the minimum boiling point phenomenon of formic acid and chloroform to the rest of the three-component system.

*Use of Physical Data in Evaluation of Entrainers*

Other relations, e.g. the complete vapor liquid relations and liquid-liquid relations for the six binaries and the four ternaries were determined for the system of the entrainer, water, formic acid, and acetic acid. These relations (only a small part of which are shown in FIGURES 1-8) demonstrate the basic usefulness and advantage of chloroform in the new process, as compared to other entrainers. Also, the physical chemical relations developed allowed the plate by plate design of the distillation columns, the operation of the decanter and other aspects of the equipment design, as well as the process design and understanding of what is actually taking place. The superiority of the properties of chloroform for this process were completely demonstrated.

From the curves of data determined in the laboratory and shown in FIGURES 2, 3, and 4, it is seen that chloroform, the entrainer-solvent of the present invention, has a distribution of acetic acid between it and water of about 1 to 4-5, depending on the acid strength in the water layer. Contrarywise, ethylene dichloride on the other hand (not shown) has a distribution of about 1 to 15-20. Hence, the washing action of the ethylene dichloride refluxed from the decanter back to the first column wherein formic acid is distilled away from acetic acid will be much poorer than that of chloroform; and a first column with many more plates will be required with ethylene dichloride to wash down the acetic acid and prevent its coming over the top. This will be even more noticeable in the use of hydrocarbons, as entrainers; since they have an even poorer distribution of acetic acid between the entrainer phase and the water phase than does ethylene dichloride.

Also of importance is the formic acid distribution between entrainer and water, as shown in FIGURE 4; since in the second column, it is desired to wash down the formic acid and hold it in the discharge of the second column. Chloroform has a distribution of formic of 1 to 50-100 compared to water; while ethylene dichloride has a distribution of formic acid of 1 to 200-300 compared to water, only about one-half to one-third as good.

The distribution coefficient of formic acid between carbon tetrachloride is 1 to 400-1500 in favor of water. Between carbon disulfide it is 1 to 750-1500 in favor of water, while for benzene it is between 1 to 70-300 in favor of water. This shows further the relative poorness in the operation of the second column of other entrainers which might be selected, or have been used less advantageously.

The importance of this distribution coefficient of chloroform as compared with the use of another solvent, carbon disulfide as entrainer, which has an even lower boiling point, was well shown by comparative operation of a distillation system with each. Carbon disulfide has a very low distribution coefficient for acetic acid out of water as compared to chloroform. Carbon disulfide operated in such a distillation system for separating formic acid from acetic acid had an even higher reflux ratio with therefore a greater wash down the first column than did chloroform. However, when so operated, it did not hold down the acetic acid to the lower part of the column but allowed some to go over the top. Similarly, ethylene dichloride does not hold down acetic acid well in this first column because of its lower distribution coefficient. Hence, in operating columns, it has been necessary to use as many as 70 plates with ethylene dichloride, while with chloroform only 20 to 30 plates are required in order to prevent acetic acid from coming over the top of this first distilling column.

Since the respective boiling points of formic acid and of water are approximately the same at 100° C., the respective azeotropic mixtures of these two liquids with entrainers always boil relatively close to each other.

No entrainer for formic acid has been found which does not have also a heterogeneous azeotropic mixture with water—and none has been found which has a ternary minimum azeotrope with water and with formic acid. (Both points agree with thermodynamic considerations.) Thus both binary azeotropes will come over the top of this first distillation column—unless indeed it happened to be so very efficient as a fractionator that it would separate one azeotrope from the other. Some water is indeed desirable with the condensate to allow the decantation into an entrainer layer and an aqueous formic acid layer.

Ethylene dichloride has been determined to be the entrainer which has the greatest variance of the boiling points of these azeotropes, wherein the azeotrope with formic acid is at about 77° C. while with water it is at about 72° or 5° C. lower. (With chloroform the azeotropic boiling point with formic acid is about 59° C. and with water about 56° C., a difference of 3° C.)

This difference in boiling points of the respective azeotropic mixtures with water and with formic acid would be important if the process to be designed depended on the separation of the water azeotrope with little formic acid by distillation of it away from the formic acid azeotrope. The present invention, however, does not attempt to remove the water alone from the acetic acid first, and then the formic acid, which would be impossible for any practical distillation system. However, it has been the intent of some of the prior art to separate these two azeotropic mixtures by distillation in the second column after their prior removal together from the acetic acid. It has been found that even with ethylene dichloride, an excessive amount of heat is required in a prohibitively high column to make even this separation. The present invention accomplishes the separation of acetic acid and formic acid without this expensive and difficult step.

All entrainers for separating formic acid from acetic acid are relatively poor for separating water from acetic acid by use of the azeotropic mixture with water because of the very low amounts of water carried over in the azeotropic mixture, by comparison with preferred materials especially selected for this purpose, e.g. butyl acetate (U.S. Patent 2,050,234). Also, water entrainers having an azeotropic mixture also with formic acid have a comparatively low distribution coefficient for acetic acid in contact with water, while a high distribution coefficient is a requirement for a good entrainer for removing water from acetic acid, in order to hold down the acetic acid in the column. While chloroform is very much better than ethylene dichloride or carbon tetrachloride or carbon bisulfide, in this regard; it is still poor compared to esters or ketones, preferred for the azeotropic removal of water alone from acetic acid.

Hence, any mixture of acetic acid containing formic acid should be substantially dehydrated, insofar as is practicable, by another process particularly adapted for that function before separating formic acid by an entrainer. (A very small amount of water is, however, desirable in the decanter of an azeotropic system to give a separation of the entrainer and the formic acid; but this may well be added in the decanter without substantially affecting the heat economy, and does not change this conclusion.)

If there is water present in the acetic acid mixture with formic acid, the water and entrainer and the formic acid and entrainer azeotropes are, in every case, brought over together in the vapor at the top of the first column. On the other hand, it has been found expensive of column height and most expensive of heat requirements to separate the azeotrope of the water and the entrainer from the azeotrope of formic acid and the entrainer in a second column due to the very close boiling points of these azeotropes.

*Conclusions of Physical-Chemical Evaluation*

Careful study of the physical-chemical properties of the several possible entrainers within the conditions indicated above and particularly the determination of the vapor-liquid equilibria and liquid-liquid equilibria conditions for the complicated binary, ternary, and quaternary systems involved with appropriate analyses of the data has shown that chloroform is an ideal material to use for the azeotropic entrainer for formic acid from mixtures with acetic acid or with acetic acid and a small amount of water. Especially is this true in the distillation process of the present invention.

Chloroform forms no azeotropic mixture with acetic acid, while forming one with formic acid. It carries a reasonably high ratio of formic acid and of water in the respective azeotropic mixtures. The chloroform-water and the chloroform-formic acid azeotropic mixtures are relatively low boiling and readily separable therefore by distillation from either acetic acid or from formic acid. Chloroform is completely soluble with formic acid.

Chloroform has a relatively very high solubility for either acetic acid or formic acid in relation to that in the water phase as compared to other possible entrainers for formic acid. Thus, the reflux wash down the first column of any distillation process is relatively effective in holding acetic acid down and preventing its coming over with the azeotropic mixtures of the formic-entrainer and water-entrainer.

FLOW SHEET OF PROCESS

Figure 9:
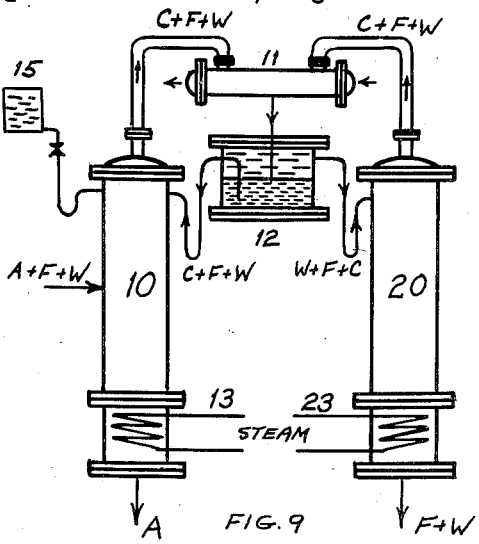

In FIGURE 9, the numbers 10 and 20 represent respectively distillation columns, with number 11 representing a condenser and number 12 representing a continuous decanter. Numbers 13 and 23 represent steam heating units, at the base of each of the respective columns. Tank 15 represents a storage tank for make-up chloroform which is withdrawn to the column from time to time as needed.

There are various feed, discharge and interconnecting pipe lines, the purpose of which will be made clear in the examples. A refers to acetic acid, F refers to formic acid, W refers to water and C refers to chloroform, the entrainer.

EXAMPLE 1

In FIGURE 9, the bubble cap distilling column 10 has 30 plates. At about its mid-point is fed continuously a liquid mixture of which there will be considered 100 pounds, as the basis of all subsequent analyses and amounts flowing. This consists of 85 pounds of acetic acid, 10 pounds of formic acid, and 5 pounds of water.

An adequate amount of chloroform has been added to the system once and for all from tank 15, the exact amount depending on the hold-up in the plates of the column, pipes, decanters, etc. Chloroform is thus present on every plate of column 10 from the top down almost to the bottom; also, chloroform is in decanter 12 and minor amounts are in the top of colum 20.

The feed liquid descends in the separating column 10, with all of the formic acid and water being distilled therefrom, in their respective azeotropic mixtures with chloroform, along with some acetic acid. The upper part of the column rectifies these relatively low boiling azeotropes from the much higher boiling acetic acid, which is effectively held down from the top. There is a rectification taking place between the acetic acid and chloroform remaining in the lower part of the column; as demonstrated by the vapor-liquid equilibrium curve for these two liquids, shown in FIGURE 1.

The chloroform readily separates as vapor as would be expected from the rather broad spread of the vapor line from the liquid line in FIGURE 1. Acetic acid goes to the bottom as liquid. This rectification zone at the bottom for this binary mixture has 5 plates. Above this is an azeotropic distillation zone of 25 plates wherein formic acid in its azeotrope with chloroform and water in its azeotrope with chloroform are separated free of acetic acid, descending as a mixture with chloroform into the lower part of the distilling column.

At the top of the column there discharges a vapor stream containing practically no acetic acid, approximately 21 pounds of formic acid, 7 pounds of water, and 480 pounds of chloroform, a total of 508 pounds. This is actually a vapor mixture of the two azeotropes containing chloroform: one with formic acid and one with water.

This vapor mixture is condensed in the condenser 11 (along with vapor from the second column also containing formic acid, chloroform, and water). A two-phase condensate separates in decanter 12 into two layers. The lower layer is the chloroform layer and it is sent as reflux back to the distilling column containing about 481 pounds of chloroform, 11.4 pounds formic acid and 1.5 pounds of water.

The water layer in the decanter contains 15.3 pounds of formic acid, 7.7 pounds of water and 2.0 pounds of chloroform. This solution discharges to the stripping column 20 which has fifteen plates, although a lesser number would probably suffice. This separates all of the chloroform overhead in a mixture of its two azeotropes with relatively small amounts of water and of formic acid. A mixture of the 10 pounds of formic acid and 5 pounds of water in the original feed substantially free of both chloroform and acetic acid are discharged from the base of column 20.

Only about 1 pound of steam is required per pound of acetic acid separated from the formic acid and water in the two distillation steps.

As shown above, it is always more economic of heat to dehydrate the acid mixture by distillation with an efficient entrainer or by some other efficient means before it is fed into this separating process for formic acid and acetic acid. Thus, a minimum amount of water should be allowed to enter the separating column 10, as in this example. The final mixture of 66⅔% formic acid and 33⅓% water, as in this example may be used or sold as such, but it may be separated, however, by any one of several known means into water and the standard 90% or 100% formic acid of commerce.

EXAMPLE 2

In the usual case it is preferred to operate with a lower amount of water in the feed than the amount of formic acid therein. Moreover, in some cases it is possible to feed to column 10 of FIGURE 9, the same distillation system as in Example 1, a substantially dry mixture of acetic and formic acid, with considerable heat economy and increased capacity as regards column 10.

Thus, there was continuously fed to column 10 of FIGURE 9 a mixture of which there will be considered 85 pounds acetic acid, 10 pounds formic acid and negligible water. The system was priorly charged with chloroform as before. 85 pounds of substantially pure acetic acid was discharged from the base of column 10, while the azeotropic mixture of formic acid and chloroform was distilled through the head of column 10, passed to condenser 11; and the condensate was passed to the decanter 12 along with a small amount of water azeotrope with formic acid. Some water from the prior operation was present in decanter 12; and an additional amount of 5 pounds per unit time was added continuously. This freshly added water along with that already present caused the separation of the condensate into two phases.

The chloroform-rich phase, containing only 0.2 pound of water and 0.2 pound of formic acid along with 48.7 pounds chloroform was passed back as reflux wash to column 10. The water distilled over in its azeotropic mixture, along with the formic acid and chloroform azeotropic mixture. This steady state (indicated by these analyses of the quantities of materials) soon was reached of water added and that in the system.

The aqueous layer from the decanter 12 containing formic acid, water, and a small amount of dissolved chloroform passed as a feed and reflux wash to the top plate of column 20, a stripper column to recover the chloroform. Here the chloroform distilled overhead in the two azeotropic mixtures, containing a small amount of water and of formic acid respectively. The cycle at the tops of the two columns, the condenser and the decanter continued; and 10 pounds formic acid containing 5 pounds of water was discharged from the base of column 20.

VARIATIONS

It is obvious from these examples that any standard type of distillation equipment which is capable of working with the solutions of acids, water and chloroform may be used; and the usual problems of corrosion, etc. will be overcome by standard methods.

Variations in equipment design and arrangement may be made; thus, for example, for reasons of control or otherwise there may be separate condensers, one for each column, with both discharging into a common decanter. Or each condenser may have its own decanter; and the solvent rich streams of each will both be passed to the first decanter, while the formic acid rich streams will both be passed to the second column.

The temperatures referred to above are not usually given closer than the nearest centigrade degree, and they are the approximate boiling points of the liquids at one atmosphere pressure. This is an exemplary pressure for convenience. However, other pressures may be used; and the boiling points will change accordingly, as well as the azeotropic boiling points—and azeotropic compositions to a lesser extent.

While the best operation is normally in a continuous manner, the process has also been operated in a batch manner with the usual attendant differences in controls, charging, etc.

The solutions of acetic acid and formic acid may contain other homologous or related acids as propionic and especially butyric, in minor or major amounts, and the removal of the formic acid is accomplished in the same way since these other acids will act as does acetic, although with higher boiling points of the resulting mixtures. Also, other liquids or solids may be dissolved in small, or in substantial amounts, if the vapor pressure, partial pressure and azeotropic relations are not greatly affected.

Water may be almost or entirely absent in the feed, in which case a small amount may be added in the decanter in a quantity sufficient to cause separation into two liquid phases; so that the chloroform-rich liquid phase may be returned as reflux to the first column; and the water-rich liquid phase containing most of the formic acid may be stripped of the chloroform which it also contains in small amount. The water may be added in the form of steam in the first column, if desired, and this aids the azeotropic distillation away from the acetic acid. It then condenses and serves in the condensate to cause two layers to form. If water is present in the feed liquid handled, it is preferably present only in a relatively low amount, preferably not over about 5% of the amount of the total acids present, or not larger in amount than the formic acid present. The water may sometimes be a much higher amount—although in this case it will usually be more economic to remove much of the water priorly by other methods. If there is a larger amount of water than the amount of formic acid, some part of this water may be allowed to pass out of the first distillation along with the acetic acid, from which it may readily be separated by many known means. Also, water will usually pass out the second column along with the formic acid, from which it may also be separated by known means. The invention concerns itself with the separation of formic acid from acetic acid, and the water present is accommodated as being incidental to the main purpose.

While chloroform has been found to be a very satisfactory entrainer for the operation of this process, completely soluble in formic acid; other entrainers which are also completely soluble in formic acid may also be used providing they allow the separation of the formic acid from the acetic acid in a first azeotropic distillation and a separation of the entrainer from the formic acid in a second azeotropic distillation by the methods described herein, using the condensation, decantation, addition of water, and liquid flow techniques described. These entrainers for the formic acid cannot be at the same time entrainers for the acetic acid, but they may be entrainers for water, as indeed are all formic acid entrainers.

We claim:

1. The process of separating formic acid from its mixture with acetic acid comprising:
    removing the acetic acid as a bottoms product in a first distillation in which the formic acid is distilled out the head of the still with chloroform which is an entrainer completely soluble in formic acid and forming an azeotropic vaporous mixture therewith;

condensing said azeotropic vaporous mixture formed in said first distillation;

adding water to the condensate so formed by said condensation of vapors;

decanting the two layers resulting from said addition of water, one of said layers being the entrainer-rich layer containing minor amounts of formic acid and water, the other of said layers being a water-rich layer containing most of the formic acid and a small amount of entrainer;

returning said entrainer-rich layer to said first distillation as a reflux wash;

passing the water-rich layer formed from said decantation to a second distillation wherein the entrainer dissolved therein is removed as an overhead product in a secondary azeotropic distillation with some of the formic acid and some of the water while most of the formic acid and most of the water discharges as a bottoms product;

condensing the vapors of said azeotropic mixtures formed in said second distillation; and decanting the two phases so obtained.

2. The process of claim 1, where the two-phase condensate from the condenser following the second distillation is added to the two phase condensate from the condenser following the first distillation, with a joining of the materials present in these liquid streams in subsequent steps.

3. The process of claim 1, where the vaporous mixture containing the two binary azeotropic mixtures entrainer and water, and entrainer and formic acid from the second distillation is added to the vaporous mixture containing the same two binary azeotropic mixtures from the first distillation, with a mixing of the materials present in these vapor streams into all of the subsequent steps.

4. In the separation of mixtures of acetic acid, formic acid, and water in lesser amount than the amount of formic acid present, the steps comprising:

a first distillation of formic acid and water with chloroform which is an entrainer completely soluble in formic acid which forms separate binary minimum azeotropic vaporous mixtures with both formic acid and with water, acetic acid being discharged as a bottom product containing substantially no formic acid and a lesser amount of water than the original feed;

a condensation of the said binary vaporous mixtures of formic acid and entrainer to give a condensate having two liquid phases, one being entrainer-rich and the other being water-rich;

a decantation of the said two-liquid phase condensate, with the said entrainer-rich layer being passed back as reflux wash to the said first distillation and the said water-rich layer being passed as feed and reflux wash to the head of a second distillation; and a second distillation, wherein the entrainer is removed from said water-rich layer in vapors containing respectively the binary azeotropic mixtures of entrainer and water, and entrainer and formic acid, and the formic acid is discharged as a bottoms product containing some water.

5. The process of claim 4, where the two-phase condensate from the condenser following the second distillation is added to the two phase condensate from the condenser following the first distillation, with a joining of the materials present in these liquid streams in subsequent steps.

6. The process of claim 4, where the vaporous mixture containing the two binary azeotropic mixtures entrainer and water, and entrainer and formic acid from the second distillation is added to the vaporous mixture containing the same two binary azeotropic mixtures from the first distillation, with a joining of the materials present in these liquid streams in the subsequent steps.

7. In the separation of mixtures of acetic acid, formic acid, and water in lesser amount than the amount of formic acid present, the steps comprising:

a first distillation of formic acid and water with chloroform which is an entrainer completely soluble in formic acid which forms separate binary minimum azeotropic vaporous mixtures with both formic acid and with water, acetic acid being discharged as a bottoms product containing substantially no formic acid and a lesser amount of water than the original feed;

a condensation of the said binary vaporous mixtures of formic acid and entrainer to give a condensate having two liquid phases, one being entrainer-rich and the other being water-rich;

a decantation of the said two-liquid phase condensate, with the said entrainer-rich layer being passed back as reflux wash to the said first distillation and the said water-rich layer being passed as feed and reflux wash to the head of a second distillation;

a second distillation, wherein the entrainer is removed from said water-rich layer in vapors containing respectively the binary azeotropic mixtures of entrainer and water, and entrainer and formic acid, and the formic acid is discharged as a bottoms product containing some water;

a condensation of said vapors from said second distillation to give a two-phase condensate; and a decantation of the said two-phase condensate resulting from said condensation from said second distillation with the entrainer-rich layer going as reflux wash to the first distillation, and the water-rich layer going as feed and reflux wash to the head of the second distillation.

8. The process of separating formic acid from mixtures with acetic acid comprising two distillation steps, each separating in respective overhead products a binary azeotropic mixture of formic acid and chloroform which is an entrainer for the formic acid, said entrainer being entirely soluble with formic acid; the first of said distillation steps removing formic acid from a bottoms product containing substantially all of the acetic acid present in the original mixture; and the second of said distillation steps removing said entrainer from a bottoms product containing substantially all of the formic acid present in the original mixture.

9. The process of claim 8, where the original mixture of formic acid and acetic acid also contains water.

10. The process of claim 8, where the original mixture of formic acid and acetic acid also contains water in an amount less than the amount of formic acid.

References Cited in the file of this patent

UNITED STATES PATENTS

| 1,804,745 | Clarke et al. | May 12, 1931 |
| 1,813,636 | Petersen et al. | July 7, 1931 |
| 2,859,154 | Othmer | Nov. 4, 1958 |

OTHER REFERENCES

"Azeotropic Data," Horsley, published by American Chemical Society (Washington, D.C., 1952), pp. 6, 15 and 20 relied upon.